United States Patent [19]

Dudko et al.

[11] Patent Number: 4,990,732
[45] Date of Patent: Feb. 5, 1991

[54] DISCHARGE DEVICE FOR MAGNETIC-PULSE WORKING AND WELDING OF METALS

[76] Inventors: Daniil A. Dudko, ulitsa A.Barbjusa, 22/26, kv. 113; Vyacheslav A. Chudakov, ulitsa A.Barbjusa, 22/26, kv. 48, both of Kiev, U.S.S.R.

[21] Appl. No.: 274,806
[22] PCT Filed: Mar. 19, 1987
[86] PCT No.: PCT/SU87/00031
  § 371 Date: Nov. 16, 1988
  § 102(e) Date: Nov. 16, 1988
[87] PCT Pub. No.: WO88/06937
  PCT Pub. Date: Sep. 22, 1988
[51] Int. Cl.$^5$ .......................... B23K 13/01; H01T 1/20
[52] U.S. Cl. ..................................... 219/9.5
[58] Field of Search ....................... 219/130.4, 7.5, 8.5, 219/9.5, 123, 124.01, 121.45, 121.46, 121.57, 121.52, 383; 315/97, 148, 236, 335, 361, 111.21, 111.41; 72/56

[56] References Cited

U.S. PATENT DOCUMENTS

| | | | |
|---|---|---|---|
| 2,964,679 | 12/1960 | Schneider et al. | 219/383 |
| 3,007,072 | 10/1961 | McGinn et al. | 219/383 |
| 3,794,805 | 2/1974 | Rudd | 219/9.5 |
| 3,869,593 | 3/1975 | New et al. | 219/121.52 |
| 4,150,274 | 4/1979 | Minin et al. | 219/59.1 |

FOREIGN PATENT DOCUMENTS

| | | | |
|---|---|---|---|
| 2258273 | 5/1974 | Fed. Rep. of Germany | 315/111.41 |
| 367498 | 1/1973 | U.S.S.R. | |
| 410502 | 1/1974 | U.S.S.R. | |
| 524267 | 8/1976 | U.S.S.R. | |
| 534004 | 10/1976 | U.S.S.R. | |
| 636825 | 12/1978 | U.S.S.R. | 219/383 |
| 1046816 | 10/1983 | U.S.S.R. | |
| 1055601 | 11/1983 | U.S.S.R. | 219/123 |

Primary Examiner—A. D. Pellinen
Assistant Examiner—Geoffrey S. Evans

[57] ABSTRACT

A discharge device for magnetic-pulse working and welding of metals includes two working electrodes with an igniter electrode in the form of a slotted ring placed therebetween. One of the working electrodes has a current-carrying portion connected to a working portion of the working electrode and is T-shaped, while the second working electrode is separated from the first working electrode and arranged coaxially therewith, and represents a sleeve, one end of which faces the working portion of the electrode and is provided with projections on the outside and inside so as to form a developed working portion of the working electrode.

6 Claims, 2 Drawing Sheets

DISCHARGE DEVICE FOR MAGNETIC-PULSE WORKING AND WELDING OF METALS

FIELD OF THE INVENTION

1. Background of the Invention

This invention relates to working and welding of metals by strong magnetic fields and in particular to discharge devices for magnetic-pulse working and welding of metals.

2. Description of the Prior Art

A vital problem in the field of high-current switching equipment is creation of an air controlled high-current low-inductance (to 15 nH) spark discharge device allowing switching of currents of up to 600,000 A and having working electrodes capable of withstanding at least $10^5$ switches.

High priority of such a problem is due in large measure to the fact that air controlled dischargers arc at present widely used in magnetic-pulse installations (cf. USSR Inventor's Certificate No. 534,004, Cl. H0IT 5/00, 1974), which have superseded vacuum dischargers despite such apparent advantages thereof as a longer service life of working electrodes and a lower internal inductance.

However, vacuum dischargers call for the utilization of intricate equipment comprising vacuum pumps, a factor generally limiting their use in high-capacity installations.

There is known a discharge device for magnetic-pulse working and welding of metals (cf. USSR Inventor's Certificate No. 524,267, Cl. H0IT 1/00, 1973), comprising a discharge chamber having a cover and accommodating two working electrodes and an igniter electrode, said electrodes being arranged coaxially, an insulating liner being interposed between the working electrodes, one of said working electrodes being electrically connected to a positive terminal of a capacitor bank, while the other working electrode is connected to a negative terminal of said capacitor bank via an inductor.

However, the working electrodes and the igniter electrode in the aforesaid device are disposed on one side of a dielectric surface, and reverse current leads are arranged on the other side of the dielectric.

An insulated current supply screen localizing a plasma discharge is arranged between the reverse current lead and the dielectric.

However, the arrangement of the working electrodes on the surface of the dielectric in an area subjected to strong temperature and dynamic effects of the plasma rapidly disables the dielectric material and fails to ensure adequate stability of a discharge channel. Consequently, internal inductance of the known device is unstable, that is, parameters of a discharge circuit vary, which is a limiting factor. Inasmuch as the aforementioned device does not include reliable insulation means, its working electrodes may not be durable. Stated differently, the discharger construction is unfit for stock or mass production.

DISCLOSURE OF THE INVENTION

The object of the present invention is to create a discharge device for magnetic-pulse working and welding of metals, in which a new embodiment and arrangement of working electrodes and an igniter electrode would allow switching currents no less than 600,000 A, with the working electrodes suited to withstand at least $10^5$ switchings, and ensure reliable and stable operation of said igniter electrode, stabilizing a plasma discharge channel.

There is provided a discharge device for magnetic-pulse working and welding, comprising a discharge chamber having a cover and accommodating two working electrodes and an igniter electrode, an insulating liner being placed between the working electrodes, one of said working electrodes being electrically connected to a positive terminal of a capacitor bank, while the other working electrode is connected to a negative terminal of the capacitor bank via an inductor. According to the invention, one of the working electrodes connected through current-supply elements to the negative terminal of the capacitor bank comprises a current-carrying portion interconnected with a working portion of said working electrode, which is T-shaped, while the other working electrode, separated from the first working electrode by the insulating liner and disposed concentrically therewith, represents a sleeve, one end of which, facing the working portion of the first working electrode, has projections on the outside and inside, thereby forming a developed working portion of the second working electrode installed with a gap relative to the working portion of the first working electrode. The igniter electrode disposed between the working portions of said working electrodes and secured to the cover of the gas-discharge chamber in an isolated condition is made as a slotted ring.

It is preferable that the current-carrying portion of the first working electrode should represent a cylindrical sleeve with taper surfaces on the inside of the ends of the cylindrical sleeve. The working portion of the first working electrode is adjacent to one of said taper surfaces, the diameter of the working portion of said working electrode adjacent to the cylindrical sleeve being smaller than the diameter of the cylindrical sleeve.

The preferred embodiment and arrangement of the working electrodes and the igniter electrode ensure distribution of plasma over a large surface of the working electrodes, thus extending their surface life by reducing erosin and decreasing internal inductance to 15nH, a feature making it possible to switch currents over 600,000 A.

It is also advantageous that the projection of the second working electrode arranged on the inside should be made as an annular toroidal lug facing the working portion of the first working electrode. An insulating sleeve is disposed on the opposite side of the lug, the end of said which is adjacent to the working portion of the working electrode being made conical. At least one circular bore is provided on the conical surface, while the second working electrode is secured to the body of the discharge chamber.

To increase the sevice life, it is further advantageous that the igniter electrode should be composed of two symmetrical parts arranged in a manner allowing opposing movement of one part relative to the other.

It is also preferable that, in order to decrease bus inductance in the discharge device, the current-supply elements should represent a flat bus arangement separated by a suitable dielectric, said elements being rigidly secured to the body of the discharge device in compliance with the invention.

The utilization of the annular torodial lug on the second working electrode permits substantial reduction of the temperature effect of plasma on the insulating sleeve whereas provision of said bore in the sleeve makes it possible to increase energy supplied to the working electrodes.

The use of said flat bus arrangement in the proposed discharger decreases the inductance of the current-supply elements by a factor of two, an advantage appreciably improving electrotechnical characteristics of the discharger.

In the discharger forming the subject of the present invention the cover of the gas-discharger chamber should desirably comprise ducts to feed air to an area wherein the plasma effect is maximum and remove air therefrom.

The proposed discharge device operates reliably due to the fact that the gas-discharge chamber is blown through with air in the area where the plasma effect is maximum and also due to the arrangement of the igniter electrode between said working electrodes.

BRIEF DESCRIPTION OF THE DRAWINGS

The invention will now be described further with reference to a specific embodiment thereof, taken in conjunction with the accompanying drawings, wherein.

DESCRIPTION OF THE PREFERRED EMBODIMENTS

Figure 1:
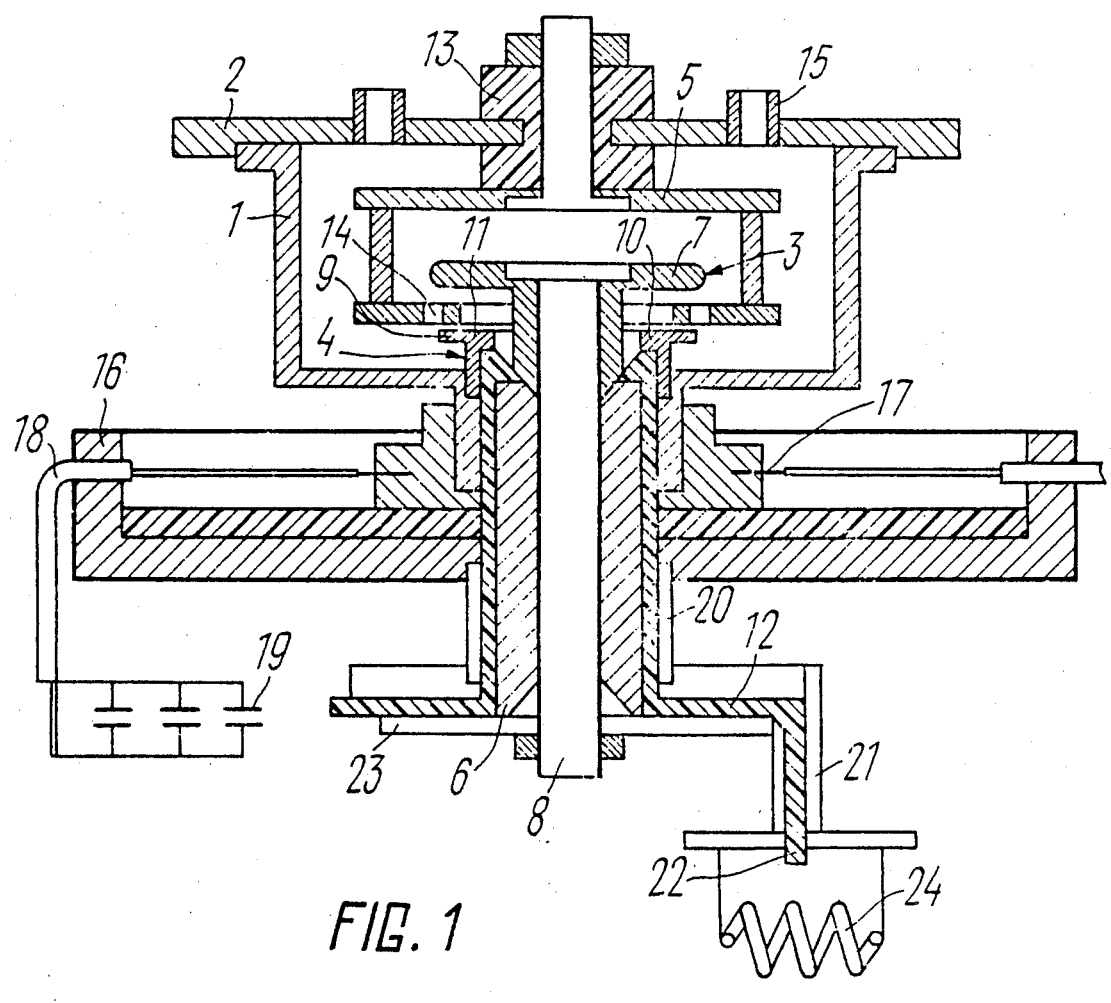
FIG. 1 is a general view of a discharge device for magnetic-pulse working and welding of metals according to the invention.

The discharge device for magnetic-pulse working and welding of metals forming the subject of the present invention comprises a gas-discharge chamber 1 with a metal cover 2, said chamber accommodating two working electrodes 3,4 and an igniter electrode 5, which are arranged coaxially.

The first working electrode 3 comprises such rigidly interconnected elements as a cylindrical sleeve 6 with taper surface on the inside of the cylindrical sleeve 6 and a working portion 7 of the working electrode 3 adjacent to one of said taper surfaces. The working portion 7 of the electrode 3 is T-shaped, the diameter of the working portion 7 of the working electrode 3 adjacent to the cylindrical sleeve 6 being smaller than the diameter of the cylindrical sleeve 6, while the cylindrical sleeve 6 and the working portion 7 of the working electrode 3 are joined over the taper surface. The cylindrical sleeve 6 acts as a current-carrying part of the working electrode 3.

For ease in operation and replacement of the working portion 7 of the working electrode 3, the working portion 7 and the cylindrical sleeve 6 are interconnected by means of a coupling bolt 8.

The second working electrode 4 secured to the discharge chamber 1 represents a sleeve, one end of which, facing the working portion 7 of the first working electrode 3, is provided with projections 9 and 10 on the outside and inside of the sleeve whereby a developed working portion 11 of the second working electrode 4 is formed.

An insulating sleeve 12 separates the second working electrode 4 from the first working electrode 3.

The working electrodes 3 and 4 are arranged concentrically with respect to each other, the working portions 7 and 11 of the working electrodes 3 and 4 being disposed with an appropriate gap.

The igniter electrode 5 is installed in the gap between the working portions 7 and 11 of the working electrodes 3 and 4, said igniter electrode being fixed to the cover 2 of the gas-discharge chamber 1 through an insulator 13.

The igniter electrode 5 is made as a slotted ring 14 to reduce the time at which the plasma acts on the working portions 7 and 11 of the working electrodes 3 and 4.

The cover 2 of the gas-discharge chamber 1 comprises ducts 15 over which air is fed to cool the working portions 7 and 11 of the working electrodes 3 and 4 and to de-gas the gas-discharge chamber 1.

In its lower portion the cylindrical sleeve 6 of the working electrode 3 is attached through the insulating sleeve 12 to a body 16 of the discharge device, said body containing a composite electrode 17 which is in contact with the discharge chamber 1, said composite electrode being electrically connected to the working electrode 4.

The composite electrode 17 is connected through a coaxial cable 18 to a positive terminal of a capacitor bank 19 whose negative terminal is connected with the body 16 of the discharge device, said body having a cylindrical portion 20 with a current-collecting plate 21 secured thereto. An insulating liner 22 separates the current-collecting plate 21 from a second current-collecting plate 23 attached to the first working electrode 3.

An inductor 24 is connected to the current-collecting plates 21 and 23.

The discharge device for magnetic-pulse working and welding of metals in compliance with the invention operates as follows.

The negative terminal of the capacitor bank 19 is connected through the coaxial cable 18 with the body 16 of the discharge device, while its positive terminal is connected with the composite electrode 17 and the discharge chamber 1 having the working electrode 4 secured thereto. After the capacitor bank 19 is charged to a predetermined operating voltage, a pulse in reverse polarity is applied to the igniter electrode 5 which ionizes the air gap between the working portions 7 and 11 of the working electrodes 3 and 4, thereby causing current switching. The switching current flowing through the working electrodes 3 and 4 of the cylindrical sleeve 6 and also through the body 16 of the discharge device and its cylindrical portion 20 comes to the current-collecting plates 21 and 23 and therefrom to the inductor 24.

Hence, a novel embodiment and arrangement of the working electrodes 3, 4 and the igniter electrode 5 ensure distribution of plasma over a larger surface of the working electrodes 3 and 4 due to which internal inductance is reduced to 15 nH, a feature allowing switching of currents of more than 600,000 A.

Owing to a large area of the working portions 7 and 11 of the working electrodes 3 and 4 and the annular ignition system, erosion of the working portions 7 and 11 of the working electrodes 3 and 4 is reduced to a minimum. As a result, the service life of the working electrodes 3 and 4 exceeds $10^5$ discharges with switching currents of up to 600,000 A.

The annular ignition system provides essentially uniform erosion of the working portions 7 and 11 of the working electrodes 3 and 4 due to which operation of the discharge device is stable.

Operating stability of the discharge device is also ensured by providing the discharge chamber 1 with a system for blowing it through with air over the ducts 15 in the cover 2, the air also being also used to cool the working electrodes 3, 4 and to de-gas the discharge chamber 1 on application of a current pulse.

A preferred embodiment of the invention is described below.

The discharge device for magnetic-pulse working and welding of metals according to the invention comprehends a discharge chamber 25 (FIG. 2) with the metal cover 2 secured thereto by means of bolts 26.

The discharge chamber 25 accommodates the first and second working electrodes 3, 27 and an igniter electrode 28.

In the preferred embodiment of the discharge device the projection of the second working electrode 27 facing the working portion 7 of the first working electrode 3 represents a toroidal lug 29. Arranged on the opposite side of said projection of the second working electrode 27 is an insulating sleeve 30 whose end adjacent to the working portion 7 of the first working electrode 3 is tapered, a circular bore 31 being provided on the taper surface.

The use of the toroidal lug 29 constituting the projection of the second working elecrode 27 allows substantial reduction of the temperature effect of plasma on the insulating sleeve 30. Moreover, provision of the circular bore 31 on the taper surface of the insulating sleeve 30 increases surface resistance to charge spread whereby the discharge device may use a higher voltage.

To increase the service life of the igniter electrode 28, its ring is composed of two symmetrical portions 32 and 33 arranged in a manner allowing opposing movement of the portion 32 relative to the other portion 33 as the portions 32 and 33 are eroded.

A plurality of holes are provided around the periphery of the ring constituting the igniter electrode 28.

The igniter electrode 28 is secured to the cover 2 of the body 25 by means of a baseplate 34 having radial slots 35. Screws 36 with bearing sleeves 37 fitted over them are fixed in said holes in the igniter electrode 28 and in the radial slots 35 of the baseplate 34, said screws being used to adjust the gap between the working electrodes 3, 27 and the igniter electrode 28. Furthermore, the screws 36 moving in the slots 35 provide for displacement of the portions 32 and 33 of the igniter electrode 28 in operation.

In its lower portion the gas-discharge chamber 25 has a circular projection 38 mounting a massive insulating disk 39 with bores around the periphery.

The gas-discharge chamber 25 is secured to a body 40 of the discharge device by means of a flange 41. Rigidly secured to the upper wall of the body 40 are current-supply elements formed with flat buses 42, 43 separated by a dielectric 44. One of the buses 42 is connected to the positive terminal of the capacitor bank 19, while the other bus 43 is connected to the negative terminal of the capacitor bank 19.

The flat buses 42, 43, the dielectric 44, the body 40, and the flange 41 are provided with holes coaxial with the holes in the massive insulating disk 39, a coupling screw 45 with insulating liners 46, 47 and 48 being fitted through said holes. The insulating liners 46 and 47 are used to separate the coupling screw 45 from the flange 41, while the insulating liner 48 separates said coupling screw from the flat bus 43.

Thus, the coupling screw 45 provides for rigid attachment of the discharge chamber 25 to the body of the discharge device and ensures reliable contact between the flat buses 42, 43 and the elements of the discharge device.

Figure 2:
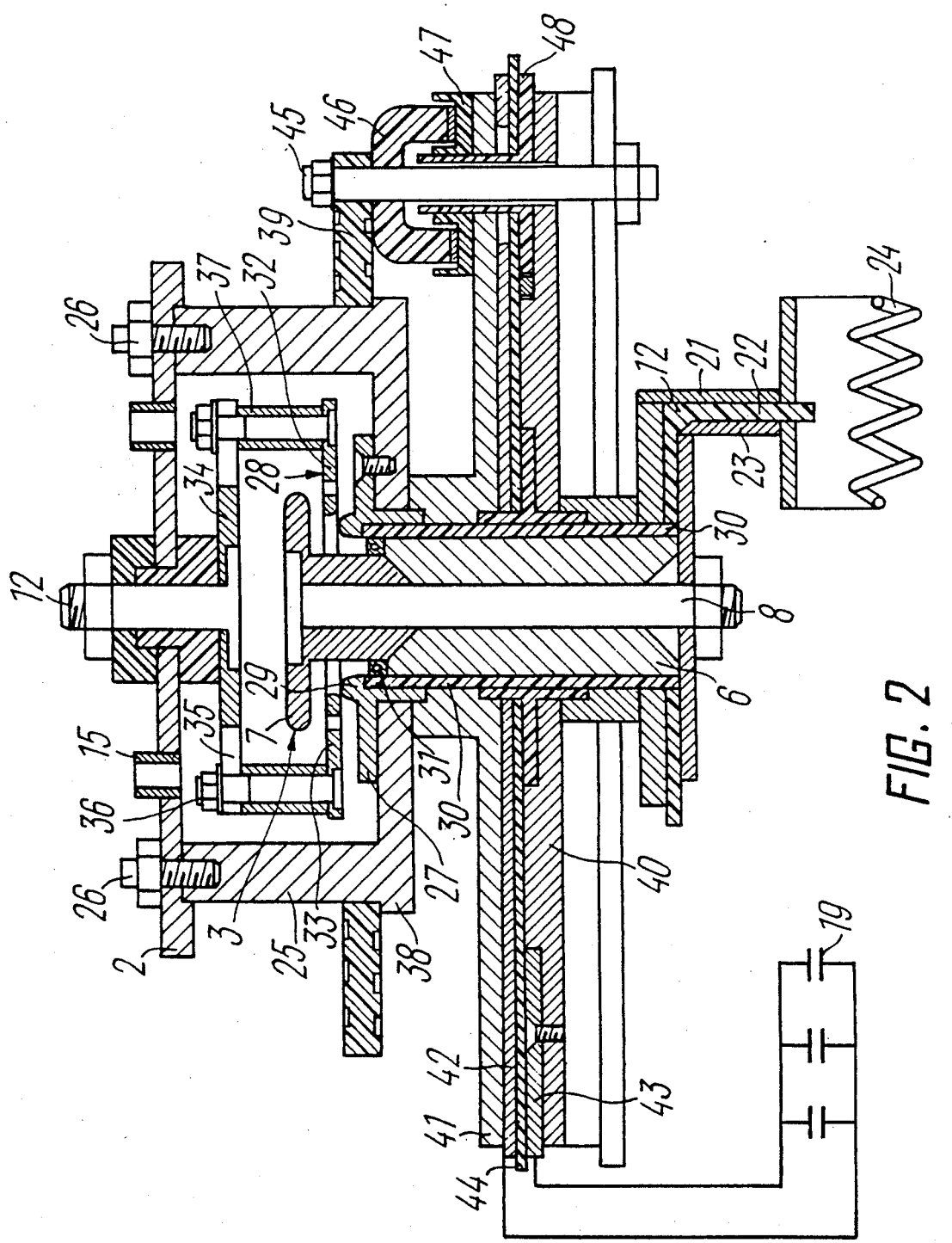
FIG. 2 shows another embodiment of the discharge device according to the invention.

The embodiment of the discharge device illustrated in FIG. 2 is in other respects similar to that of FIG. 1.

The discharge device of FIG. 2 operates in much the same manner as the embodiment shown in FIG. 1.

As is apparent from the description of the present invention, the proposed discharge device is characterized by a dynamically stable and reliable structure, which essentially solves the vital problems of the background art.

The invention may be used in machine building in production of magnetic-pulse installations and also in electrical engineering in switching of high-current circuits.

We claim:

1. A discharge device for magnetic-pulse working and welding of metals, comprising: a body with current-supply elements and a discharge chamber accomodating a first working electrode and a second working electrode and an igniter electrode, said electrodes being arranged coaxially, an insulating sleeve being placed between the working electrodes, one of said working electrodes being electrically connected to a positive terminal of a capacitor bank, while the other working electrode is connected to a negative terminal of the capacitor bank through an inducter, characterized in that the discharge chamber is secured to said body said first working electrode is connected via current supply elements to said negative terminal of said capacitor bank and comprises a current-carrying portion connected to a working portion of the first working electrode, being T-shaped, while said second working electrode is separated from the first working electrode by an insulating sleeve and arranged coaxially with the first working electrode, said second working electrode being in the shape of a sleeve, one end of which faces the working portion of the first working electrode and is provided with projections on the outside and inside so as to form a developed working portion of the second working electrode and an igniter electrode is disposed between the working portions of the working electrodes and secured to a cover of the gas-discharge chamber in an insulated condition, said igniter electrode being in the shape of a slotted ring.

2. A discharge device as claimed in claim 1, wherein the current-carrying portion of the first working electrode is a cylindrical sleeve with taper surfaces on the inside of the ends of the cylindrical sleeve, the working portions of the first working electrode being adjacent to one of said taper surfaces, the diameter of the working portion of the first working electrode adjacent to the cylindrical sleeve being smaller than the diameter of the cylindrical sleeve.

3. A discharge device as claimed in claim 1, wherein the projection of the second working electrode arranged on the inside is a toroidal lug facing the working portion of the first working electrode an insulating sleeve being disposed on the other side of said projection, the end of said insulating sleeve adjacent to the working portion of the first working electrode having at least one circular bore, while the second working electrode is secured to the body of the gas-discharge chamber.

4. A discharge device as claimed in claim 1, wherein the ring of the igniter electrode is composed of two symmetrical parts arranged in a manner allowing opposing movement of one part relative to the other part.

5. A discharge device as claimed in claim 1, wherein the current supply elements comprise flat buses separated by a suitable dielectric and rigidly-secured to the body of the discharge device.

6. A discharge device as claimed in claim 1, wherein the cover of the gas-discharge chamber has ducts adapted to feed air to an area wherein the plasma effect is maximum and to remove the air therefrom.

* * * * *